US012381895B2

(12) United States Patent
Bulgakov et al.

(10) Patent No.: US 12,381,895 B2
(45) Date of Patent: *Aug. 5, 2025

(54) DIGITAL SECURITY VIOLATION SYSTEM

(71) Applicant: Capital One Services, LLC, McLean, VA (US)

(72) Inventors: Mykhaylo Bulgakov, Arlington, VA (US); Joshua Edwards, Philadelphia, PA (US); Andrea Montealegre, Arlington, VA (US); George Bergeron, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 17 days.

This patent is subject to a terminal disclaimer.

(21) Appl. No.: 18/479,339

(22) Filed: Oct. 2, 2023

(65) Prior Publication Data
US 2024/0031386 A1 Jan. 25, 2024

Related U.S. Application Data

(63) Continuation of application No. 17/175,103, filed on Feb. 12, 2021, now Pat. No. 11,777,959.

(51) Int. Cl.
*H04L 9/40* (2022.01)
*G06F 16/951* (2019.01)
*G06Q 20/38* (2012.01)

(52) U.S. Cl.
CPC ........ *H04L 63/1416* (2013.01); *G06F 16/951* (2019.01); *G06Q 20/383* (2013.01)

(58) Field of Classification Search
USPC ........................................................ 726/23
See application file for complete search history.

(56) References Cited

U.S. PATENT DOCUMENTS 6,532,543 B1    3/2003  Smith et al.
10,972,483 B2 *  4/2021  Thomas .............. H04L 63/1441
(Continued)

FOREIGN PATENT DOCUMENTS

CN    110999250    4/2020
GB      2506450    4/2014

OTHER PUBLICATIONS

Farah, et al., "Assessment of vulnerabilities of web applications of Bangladesh: A case study of XSS & CSRF," 2016 sixth international conference on digital information and communication technology and its applications (DICTAP), IEEE, 2016, pp. 74-78.

*Primary Examiner* — Sakinah White Taylor
(74) *Attorney, Agent, or Firm* — Foley & Lardner LLP

(57) ABSTRACT

A computing system determines that a third party system has been exposed to a digital security violation. The computing system identifies a first user account of a user registered with the computing system that has a corresponding account associated with the third party system. The computing system determines that the first user account has stored a first set of user credentials for the corresponding account associated with the third party system at a storage location accessible by the computing system. The computing system launches a series of web browsers configured to access a first website associated with the third party system. The computing system executes, via a first web browser of the series of web browsers, a first automated script specific to the first website associated with the third party system. The computing system performs at least one of a plurality of remedial operations with respect to the corresponding account.

14 Claims, 6 Drawing Sheets

(56) References Cited

U.S. PATENT DOCUMENTS

| | | | |
|---|---|---|---|
| 11,017,464 B1* | 5/2021 | Harris | H04L 63/1416 |
| 11,314,889 B2* | 4/2022 | Caldwell | H04L 63/1416 |
| 11,616,811 B2* | 3/2023 | Thomas | H04L 63/0254 |
| | | | 726/11 |
| 2016/0260129 A1 | 9/2016 | Fadeev et al. | |
| 2018/0063190 A1* | 3/2018 | Wright | H04L 63/1425 |
| 2019/0108363 A1* | 4/2019 | Caldwell | G06F 21/554 |
| 2020/0050773 A1 | 2/2020 | Schroeder et al. | |
| 2020/0053111 A1 | 2/2020 | Jakobsson | |
| 2020/0128047 A1* | 4/2020 | Biswas | H04L 67/10 |
| 2020/0412767 A1* | 12/2020 | Crabtree | H04L 63/1441 |

\* cited by examiner

DIGITAL SECURITY VIOLATION SYSTEM

CROSS-REFERENCE TO RELATED APPLICATION

This application is a continuation of U.S. application Ser. No. 17/175,103, filed Feb. 12, 2021, which is incorporated by reference in its entirety.

FIELD OF THE DISCLOSURE

Embodiments disclosed herein generally related to a digital security violation system.

BACKGROUND

A data breach is an intentional or unintentional release of secure, private, and/or confidential information to an untrusted environment or entity. In some cases, login information used to access a website may be compromised from the data breach. In these cases, an individual with an account used to access the website may have to update their credentials to prevent unauthorized access to the account.

SUMMARY

In some embodiments, a method is disclosed herein. A computing system determines that a third party system has been exposed to a digital security violation. The computing system identifies a first user account of a user registered with the computing system that has a corresponding account associated with the third party system. The computing system determines that the user has a second corresponding account with a second third party system. The computing system determines that the first user account has stored a first set of user credentials for the corresponding account associated with the third party system at a storage location accessible by the computing system. The computing system that the first user account has stored a second set of user credentials for the second corresponding account associated with the third party system at the storage location accessible by the computing system. The computing system launches a series of web browsers configured to access a first website associated with the third party system and a second website associated with the second third party system. The computing system executes, via a first web browser of the series of web browsers, a first automated script specific to the first website associated with the third party system. The first automated script configured to access the corresponding account with the third party system using the first set of user credentials stored at the storage location. The computing system performs, via the first web browser, at least one of a plurality of remedial operations with respect to the corresponding account. The computing system executes, via a second web browser of the series of web browsers, a second automated script specific to the second website associated with the second third party system. The second automated script is configured to access the corresponding account with the second third party system using the second set of user credentials stored at the storage location. The computing system performs, via the second web browser, at least one of a plurality of remedial operations with respect to the second corresponding account.

In some embodiments, the first automated script specific to the first web site is configured to mimic a first set of operations performed by a user when logging into the corresponding account via the first web site.

In some embodiments, the second automated script specific to the second website is configured to mimic a second set of operations performed by the user when logging into the second corresponding account via the second website.

In some embodiments, determining that the third party system has been exposed to the digital security violation includes the computing system crawling a plurality of news websites and applying natural language processing to news headlines or news articles to determine whether the digital security violation occurred.

In some embodiments, performing, by the computing system, at least one of a plurality of remedial operations with respect to the corresponding account includes altering a stored payment option associated with the corresponding account.

In some embodiments, altering the stored payment option associated with the corresponding account includes generating a new obfuscated payment option and replacing the stored payment option with the new obfuscated payment option.

In some embodiments, the computing system pushes a notification to a client device associated with the first user account notifying a user of the digital security violation and a remedial option taken.

In some embodiments, a non-transitory computer readable medium is disclosed herein. The non-transitory computer readable medium includes instructions which, when executed by a computing system, cause the computing system to perform operations. The operation includes determining, by the computing system, that a third party system has been exposed to a digital security violation. The operations further include identifying, by the computing system, a first user account of a user registered with the computing system that has a corresponding account associated with the third party system. The operations further include determining, by the computing system, that the first user account has stored a first set of user credentials for the corresponding account associated with the third party system at a storage location accessible by the computing system. The operations further include launching, by the computing system, a series of web browsers configured to access a first website associated with the third party system. The operations further include executing, by the computing system via a first web browser of the series of web browsers, a first automated script specific to the first website associated with the third party system. The first automated script is configured to access the corresponding account with the third party system using the first set of user credentials stored at the storage location. The operations further include performing, by the computing system via the first web browser, at least one of a plurality of remedial operations with respect to the corresponding account.

In some embodiments, the first automated script specific to the first website is configured to mimic a first set of operations performed by a user when logging into the corresponding account via the first website.

In some embodiments, the operations further include accessing, by the computing system, stored information associated with the first user account. The operations further include determining, by the computing system, that the user has a second corresponding account with a second third party system that shares personal data with the corresponding account associated with the third party system. The operations further include, based on the determining, accessing, by the computing system, a second set of user credentials for the second corresponding account associated with the third party system at the storage location accessible by the computing system. The operations further include executing, by the computing system via a second web browser of the series of web browsers, a second automated script specific to a second website associated with the second third party system. The second automated script is configured to access the second corresponding account with the second third party system using the second set of user credentials stored at the storage location. The operations further include performing, by the computing system via the second web browser, at least one of a plurality of remedial operations with respect to the second corresponding account.

In some embodiments, the second automated script specific to the second website is configured to mimic a second set of operations performed by the user when logging into the second corresponding account via the second website.

In some embodiments, determining, by the computing system, that the third party system has been exposed to the digital security violation includes crawling a plurality of news websites and applying natural language processing to news headlines or news articles to determine whether the digital security violation occurred.

In some embodiments, performing, by the computing system, at least one of a plurality of remedial operations with respect to the corresponding account includes altering a stored payment option associated with the corresponding account.

In some embodiments, altering the stored payment option associated with the corresponding account includes generating a new obfuscated payment option and replacing the stored payment option with the new obfuscated payment option.

In some embodiments, the operations further include pushing, by the computing system, a notification to a client device associated with the first user account notifying a user of the digital security violation and a remedial option taken.

In some embodiments, a system is disclosed herein. The system includes a processor and a memory. The memory has programming instructions stored thereon, which, when executed by the processor, performs operations. The operations include determining that a third party system has been exposed to a digital security violation. The operations further include identifying a first user account of a user registered with the system that has a corresponding account associated with the third party system. The operations further include determining that the user has a second corresponding account with a second third party system. The operations further include determining that the first user account has stored a first set of user credentials for the corresponding account associated with the third party system at a storage location accessible by the system. The operations further include determining that the first user account has stored a second set of user credentials for the second corresponding account associated with the third party system at the storage location accessible by the system. The operations further include launching a series of web browsers configured to access a first website associated with the third party system and a second website associated with the second third party system. The operations further include executing, via a first web browser of the series of web browsers, a first automated script specific to the first website associated with the third party system, the first automated script configured to access the corresponding account with the third party system using the first set of user credentials stored at the storage location. The operations further include performing, via the first web browser, at least one of a plurality of remedial operations with respect to the corresponding account. The operations further include executing, via a second web browser of the series of web browsers, a second automated script specific to the second website associated with the second third party system. The second automated script is configured to access the corresponding account with the second third party system using the second set of user credentials stored at the storage location. The operations further include performing, via the second web browser, at least one of a plurality of remedial operations with respect to the second corresponding account.

In some embodiments, the first automated script specific to the first website is configured to mimic a first set of operations performed by a user when logging into the corresponding account via the first website.

In some embodiments, second automated script specific to the second website is configured to mimic a second set of operations performed by the user when logging into the second corresponding account via the second website.

In some embodiments, determining that the third party system has been exposed to the digital security violation includes crawling a plurality of news websites and applying natural language processing to news headlines or news articles to determine whether the digital security violation occurred.

In some embodiments, performing at least one of a plurality of remedial operations with respect to the corresponding account includes generating a new obfuscated payment option and replacing a stored payment option with the new obfuscated payment option.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein are generally directed to a digital security violation system and a method of operating the same. For example, one or more techniques described herein provides a system that actively monitors when various third party systems may have experienced a digital security violation. Upon determining that a third party system experienced a digital security violation, the digital security violation system may execute a series of actions configured to mitigate or reduce the damage caused by the digital security violation. For example, the present system may execute an automated script dedicated to the website associated with a compromised third party system to automatically update user credentials of the user on the website of the third party system. In this manner, the present digital security violation system may provide a means to reduce or minimize the effect of a digital security violation on a user.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
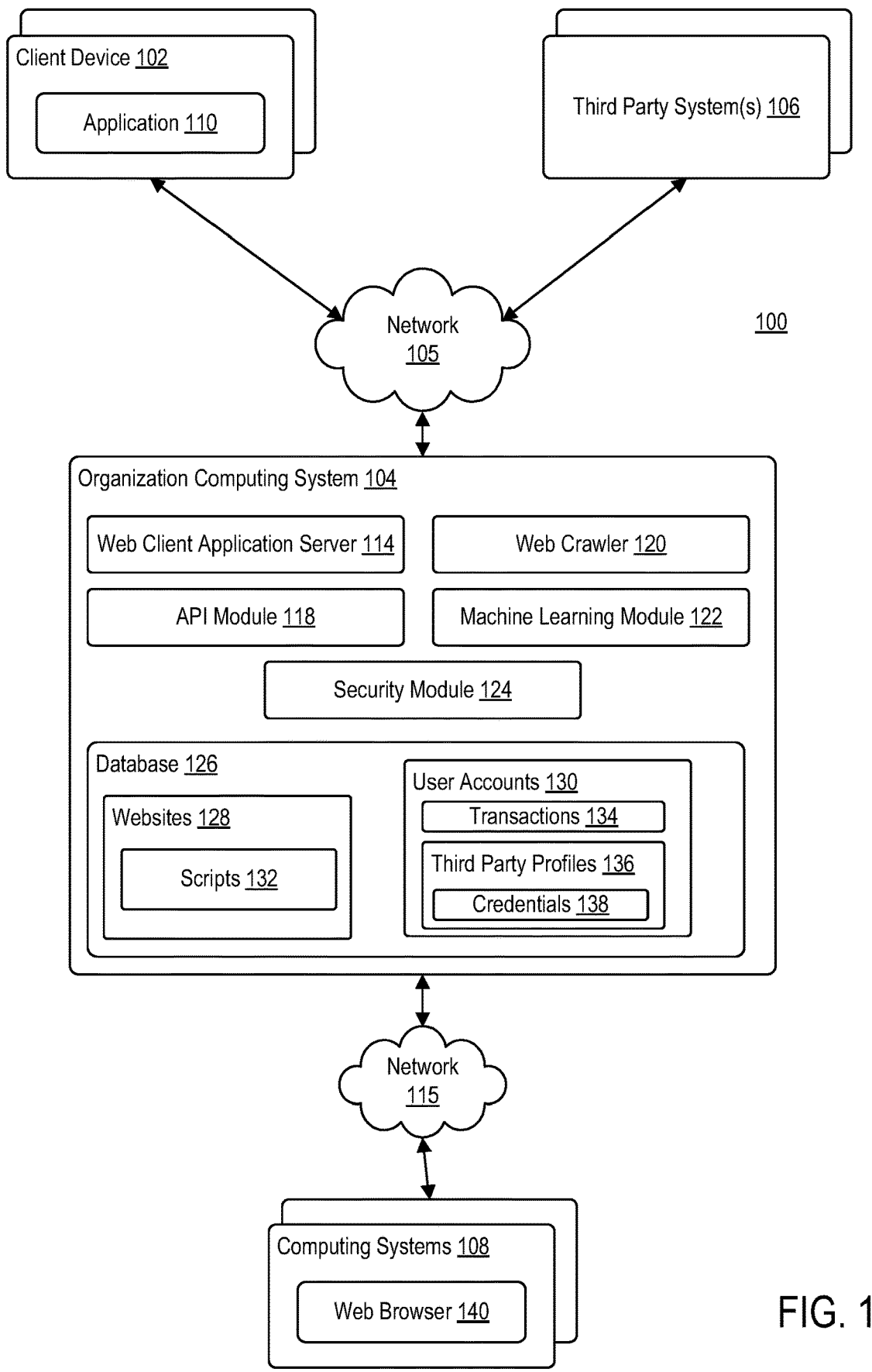
FIG. 1 is a block diagram illustrating a computing environment, according to one exemplary embodiment.

FIG. 1 is a block diagram illustrating a computing environment 100, according to one embodiment. Computing environment 100 may include at least one or more client devices 102, an organization computing system 104, and one or more third party systems 106 communicating via network 105. In some embodiments, computing environment 100 may further include one or more computing systems 108 communicating with organization computing system 104 via network 115.

Each of network 105 and network 115 may be of any suitable type, including individual connections via the Internet, such as cellular or Wi-Fi networks. In some embodiments, each of network 105 and network 115 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Each of network 105 and network 115 may include any type of computer networking arrangement used to exchange data. For example, network 105 and network 115 may include any type of computer networking arrangement used to exchange information. For example, each of network 105 and network 115 may be the Internet, a private data network, virtual private network using a public network and/or other suitable connection(s) that enables components in computing environment 100 to send and receiving information between the components of computing environment 100.

Client device 102 may be operated by a user. For example, client device 102 may be a mobile device, a tablet, a desktop computer, or any computing system having the capabilities described herein. Client device 102 may belong to or be provided to a customer or may be borrowed, rented, or shared. Customers may include individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 102 may include at least application 110. Application 110 may be representative of a web browser that allows access to a website or a stand-alone application. Client device 102 may access application 110 to access functionality of organization computing system 104. Client device 102 may communicate over network 105 to request a webpage, for example, from web client application server 114 of organization computing system 104. For example, client device 102 may be configured to execute application 110 to access content managed by web client application server 114. The content that is displayed to client device 102 may be transmitted from web client application server 114 to client device 102, and subsequently processed by application 110 for display through a graphical user interface (GUI) of client device 102.

Organization computing system 104 may include at least web client application server 114, application programming interface (API) module 118, web crawler 120, machine learning module 122, and security module 124. Each of API module 118, web crawler 120, machine learning module 122, and security module 124 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Security module 124 may be configured to determine when a third party system (e.g., third party computing system 106) has been exposed to a digital security violation. In some embodiments, a digital security violation may refer to a data or security breach, in which personal identification information of an individual has been exposed. More generally, a digital security violation may refer to an incident that results in unauthorized access to computer data. With respect to computing environment 100, a digital security violation may refer to an incident that results in unauthorized access to computer data managed by a third party computing system 106.

In some embodiments, security module 124 may be configured to identify when a third party system has been exposed to a digital security violation via one or more application programming interfaces (APIs) linking organization computing system 104 to one or more third party systems 106. API module 118 may be configured to manage communications via one or more APIs linking organization computing system 104 to one or more third party systems 106. In some embodiments, organization computing system 104 may be notified directly of a data breach from a third party system 106 via API module 118.

In some embodiments, security module 124 may be configured to identify when a third party system has been exposed to a digital security violation via web crawler 120. Web crawler 120 may be representative of an Internet bot that may be configured to scan the world wide web to determine if an entity experienced a data breach. For example, web crawler 120 may be configured to scan various news websites to determine whether an entity (e.g., department store, financial bureau, technology company, etc.) associated with a third party system 106 experienced a data breach. In some embodiments, web crawler 120 may be configured with natural language processing technology in order to digest, interpret, and determine whether a website includes information related to a data breach. In some embodiments, web crawler 120 may be configured to scan various news outlets to determine if an entity associated with a third party system 106 has been exposed to a data breach. In some embodiments, web crawler 120 may be configured to scan various research description framework (RDF) site summary (RSS) feeds to determine if an entity associated with a third party system 106 has been exposed to a data breach.

Once a digital security violation has been detected, security module 124 may execute a series of operations to mitigate the breadth of exposures for certain individuals that may have been exposed as a result of the digital security violation.

In some embodiments, the series of operations to mitigate the breadth of exposures for certain individuals may include identifying certain users that may have an account with a compromised third party computing system 106. For example, security module 124 may access database 126 to determine whether a user as an account with a compromised third party computing system 106 or have otherwise interacted with third party computing system 106.

As shown, database 126 may include one or more user accounts 130. Each user account may include a plurality of transactions 134 and one or more third party profiles 136. Generally, plurality of transactions 134 may correspond to a plurality of transactions associated with the user. In some embodiments, the plurality of transactions 134 may be associated with a payment instrumented issued by an organization associated with organization computing system 104. In some embodiments, the plurality of transactions 134 may correspond to all electronic transactions associated with a user, regardless of the issue of a payment instrument. For example, a user may grant organization computing system 104 electronic access to one or more electronic payment accounts associated with the user. Organization computing system 104 may aggregate transaction data from a plurality of institutions and manage the data via database 126.

In some embodiments, each transaction of the plurality of transactions 134 may include one or more parameters associated therewith. For example, each parameter may include a date of the transaction, a source of the transaction, an amount of the transaction, a payment instrument associated with the transaction, and the like.

In some embodiments, responsive to determining that a third party system 106 has experienced a digital security violation, security module 124 may be configured to determine those users that may be vulnerable to a data leak based at least in part on plurality of transactions 134. For example, security module 124 may parse plurality of transactions 134 across all user accounts 130 to identify those users that have transacted with an entity associated with third party system 106. In some embodiments, security module 124 may limit the search to a specific period of time (e.g., all transactions with an entity associated with third party system 106 within two weeks of the reported digital security violation). Accordingly, in this manner, security module 124 may be configured to determine whether a particular user may be vulnerable to a reported digital security violation.

In some embodiments, responsive to determining that a third party system 106 has experienced a digital security violation, security module 124 may be configured to determine those users that have stored their credentials with third party system 106 in their user account 130. For example, as shown, each user account 130 stored in database 126 may include one or more third party profiles 136. Each third party profile 136 may be associated with a respective third party system 106. For example, each third party profile 136 may be representative with a user's account with a respective third party system 106. In some embodiments, each third party profile 136 may include credentials 138 associated therewith. In some embodiments, credentials 138 may be representative of authentication information associated with the user's third party account. For example, credentials 138 may include one or more of a user name and account password.

If, for example, security module 124 determines that a third party system 106 has experienced a digital security violation, security module 124 may identify those users associated with third party system 106 by parsing all user accounts 130 to identify those users that have stored their third party profile 136 information in database 126.

Once security module 124 determines that a user's data may be have been exposed in a digital security violation, security module 124 may execute a series of actions to mitigate any damage that may have been caused by the digital security violation. In some embodiments, security module 124 may execute a series of actions to automatically change or update user data managed by a third party system 106. For example, security module 124 may determine that a user has stored their payment instrument that has been issued by an organization associated with organization computing system 104 in their third party account managed by third party system 106.

In response to determining that the third party system 106 experienced a digital security violation, security module 124 may execute a series of automated scripts that navigate to the user's account page managed by web servers associated with third party system 106 and cancel and/or update payment information on the website. For example, if a user utilizes a virtual card number corresponding to a payment instrument issued from an organization associated with organization computing system 104, security module 124 may implement a series of actions to log into the user's account with third party system 106, navigate to the user's profile page, and either change or update the virtual card number on file.

In some embodiments, responsive to determining that a respective third party system 106 has been exposed to a digital security violation, security module 124 may be configured to identify a payment instrument the user used with third party system 106 and identify other third party systems 106 with which the user has used the same payment instrument. In other words, security module 124 may take additional steps to mitigate the damage caused by a digital security violation by updating a user's payment credentials with other third party systems 106. For example, assuming that entity A experienced a digital security violation, security module 124 may determine that a user has used a payment instrument issued by an organization associated with organization computing system 104 with entity A. Security module 124 may also determine that the user has stored this payment instrument with entity B. For example, security module 124 may identify the payment instrument the user has either used with entity A or stored with entity A. Using that payment instrument, security module 124 may parse transactions 134 to determine that the user has used that payment instrument with entity B. Because security module 124 may execute a series of actions that include updating the payment device with entity A, security module 124 may also execute a subsequent or parallel series of actions that include updating the payment device with entity B as well. In this manner, security module 124 may take actions to mitigate the damage caused by the digital security violation, while at the same time reducing the onus that would otherwise be placed on the user for updating their payment information for other entities.

In some embodiments, machine learning module 122 may be configured to generate one or more automated scripts for navigating one or more third party websites. For example, machine learning module 122 may be configured to learn how to traverse a website of a respective third party system 106, such that an automated script may be generated for that website. In some embodiments, machine learning module 122 may implement one or more machine learning algorithms to train generate one or more automated scripts. For example, machine learning module 122 may use one or more of a decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, and the like. Machine learning module 122 may save each script in database 126.

As illustrated, database 126 may include one or more websites 128 stored therein. Each website 128 may correspond to a website associated with a respective third party system 106. Each website 128 may include one or more scripts 132. Each script 132 may correspond to a series of steps to be automatically executed by a computing device in order to navigate to a user's account with a given website 128 so that a user's credentials may be changed, upon detecting a digital security violation. In some embodiments, each script 132 stored in database 126 may be generated by machine learning module 122.

Further, as shown, organization computing system 104 may communicate with one or more computing system 108 via network 115. In some embodiments, each computing system 108 may be representative of a back-end computing system associated with organization computing system 104. Each computing system 108 may include a web browser 140 associated therewith. In operation, upon determining that an entity associated with a third party system 106 has experienced a digital security violation, security module 124 may identify a website 128 associated with the entity and a script 132 associated with the website. Security module 124 may execute the automated script via web browser 140 executing on computing system 108. In this manner, security module 124 may trigger an automated process by which organization computing system 104 may manage user data responsive to detecting that the user may be subject to a digital security violation.

Figure 2:
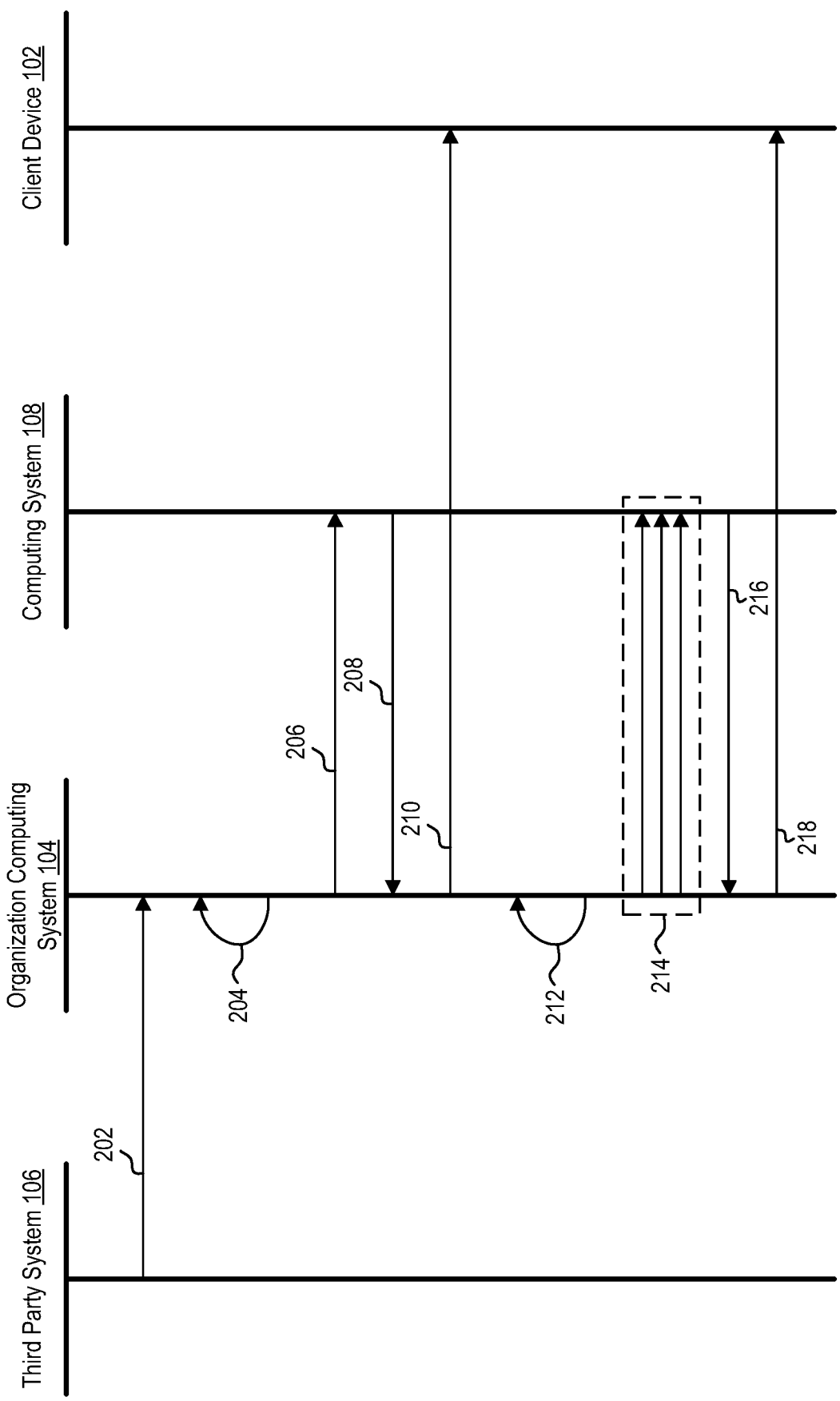
FIG. 2 is a block diagram illustrating communications among components of computing environment, according to example embodiments.

FIG. 2 is a block diagram illustrating communications among components of computing environment 100, according to example embodiments.

At operation 202, a third party system 106 may notify organization computing system 104 that that third party system 106 experienced a digital security violation. In some embodiments, third party system 106 may transmit an electronic message to organization computing system 104, notifying organization computing system 104 that third party system 106 underwent a digital security violation. In some embodiments, third party system 106 may automatically transmit a message to organization computing system 104, responsive to detecting a digital security violation. For example, third party system 106 may leverage API functionality to notify organization computing system 104 that third party system 106 underwent a digital security violation.

At operation 204, organization computing system 104 may receive the notification from third party system 106 and perform a set of operations to mitigate or reduce any damage caused by the digital security violation. In some embodiments, security module 124 may identify certain users that may have an account with a compromised third party computing system 106. For example, security module 124 may access database 126 to determine whether a user has an account with a compromised third party computing system 106 or have otherwise interacted with third party computing system 106. Security module 124 may identify those users that may be vulnerable to the digital security violation based at least in part on plurality of transactions 134 stored in database 126. For example, security module 124 may parse plurality of transactions 134 across all user accounts 130 to identify those users that have transacted with an entity associated with third party system 106. In some embodiments, security module 124 may limit the search to a specific period of time (e.g., all transactions with an entity associated with third party system 106 within two weeks of the reported digital security violation).

In some embodiments, once security module 124 identifies a user that might have been affected by the digital security violation based on their transaction history, security module 124 may determine whether that user has stored their credentials for a website associated with third party computing system 106 in their user account 130. For example, each user account 130 stored in database 126 may include one or more third party profiles 136. Each third party profile 136 may be associated with a respective third party system 106. In some embodiments, each third party profile 136 may include credentials 138 associated therewith. In some embodiments, credentials 138 may be representative of authentication information associated with the user's third party account. For example, credentials 138 may include one or more of a user name and account password.

At operation 206, responsive to determining that the user has stored their user credentials with a website associated with third party system 106 in their user account 130, security module 124 may launch a web browser 140 in a computing system 104. Via web browser 140, security module 124 may execute an automated script specific to a website associated with third party system 106. In some embodiments, the automated script may be generated by machine learning module 122 and configured to mimic a set of operations that would typically be performed by a user when logging into their account with the website. Using the automated script, security module 124 may perform at least one of a plurality of remedial operations with respect to the user's account.

In some embodiments, the at least one of a plurality of remedial operations may include altering a stored payment option associated with the user's account. For example, if a user's account includes an obfuscated payment option (e.g., a virtual card number) that may be associated with a payment instrument issued by organization computing system 104, security module 124 may generate a new obfuscated payment option and replace the existing obfuscated payment option with the new obfuscated payment option.

In another example, if a user's account includes a physical payment instrument (e.g., payment details associated with a physical payment device) that may be issued by organization computing system 104, security module 124 may implement a backend process that cancels the physical payment instrument and begins the process of issuing a new physical payment instrument to be mailed to the user.

At operation 208, computing system 108 may notify organization computing system 104 that the one or more remedial options are complete. At operation 210, responsive to receiving a notification from computing system 108, organization computing system 104 may notify client device 102 of the user of the one or more remedial options taken by security module 124. For example, organization computing system 104 may notify client device 102 of a change of an obfuscated payment option or a cancelling of an existing physical payment device and issuing of a new physical payment device.

At operation 212, organization computing system 104 may determine whether the infected payment instrument is linked to other accounts of a user. For example, responsive to determining that a respective third party system 106 has been exposed to a digital security violation, security module 124 may be configured to identify a payment instrument the user used with third party system 106 and identify other third party systems 106 with which the user has used the same payment instrument. In other words, security module 124 may take additional steps to mitigate the damage caused by a digital security violation by updating a user's payment credentials with other third party systems 106. In some embodiments, security module 124 may identify other accounts of the user by parsing a plurality of transactions 134 associated with the user to identify other entities or organizations with which the user utilized the infected payment instrument. Security module 124 may then determine whether the user has stored their credentials for websites associated with other third party computing systems 106 in their user account 130.

At operation 214, responsive to determining that the infected payment instrument is linked to other websites associated with other third party system 106 in their user account 130, security module 124 may launch a series of web browsers 140 in one or more computing systems 108. Via the one or more web browsers 140, security module 124 may execute a series of automated scripts, each script specific to a website associated with a respective third party system 106. Using the automated script, security module 124 may perform at least one of a plurality of remedial operations with respect to the user's account.

At operation 216, computing system 108 may notify organization computing system 104 that the one or more remedial options are complete. At operations 218, responsive to receiving one or more notifications from computing system 108, organization computing system 104 may notify client device 102 of the user of the one or more remedial options taken by security module 124.

Figure 3:
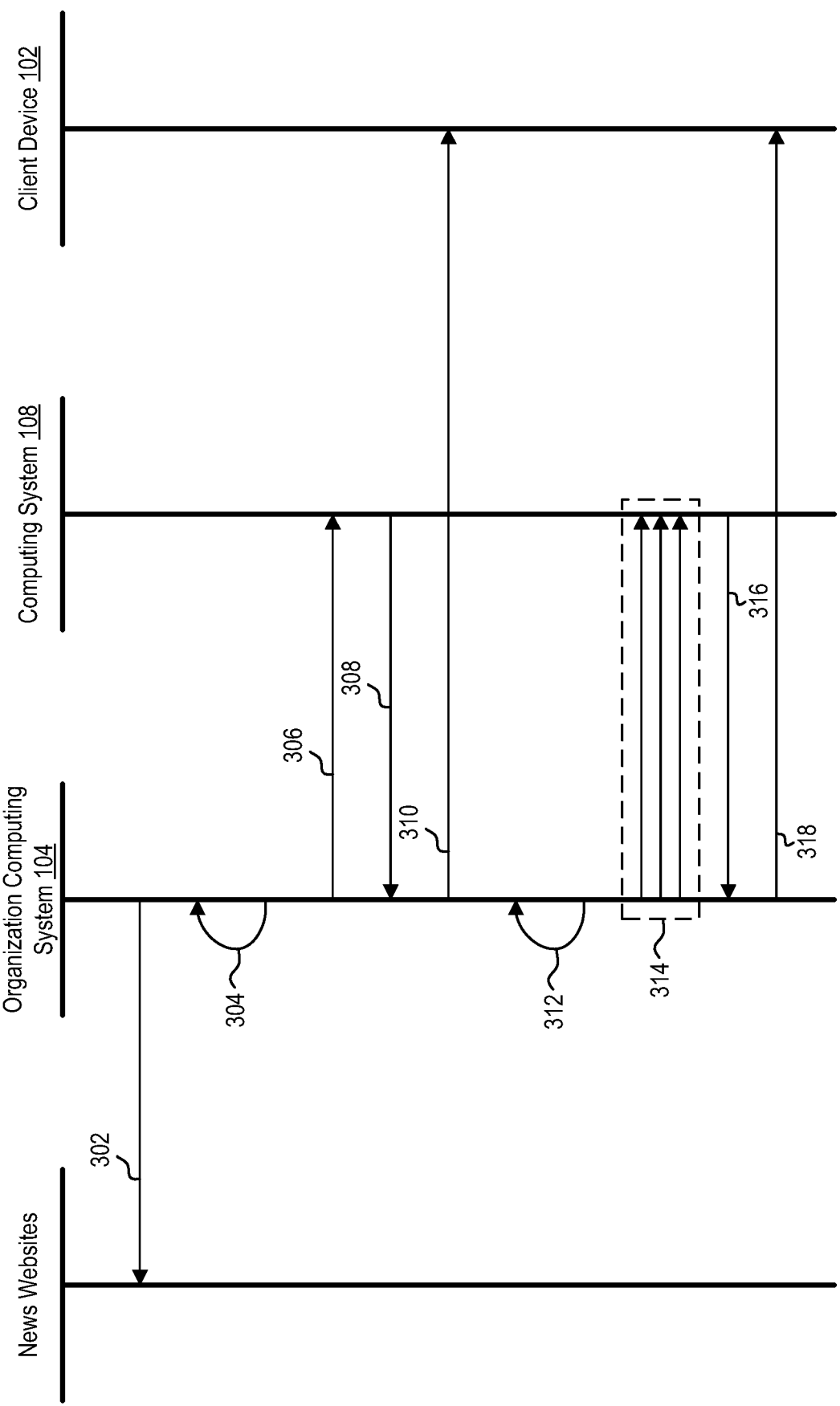
FIG. 3 is a block diagram illustrating communications among components of computing environment, according to example embodiments.

FIG. 3 is a block diagram illustrating communications among components of computing environment 100, according to example embodiments.

At operation 302, security module 124 may identify that a third party system 106 has been exposed to a digital security violation via web crawler 120. Web crawler 120 may scan the world wide web to determine if an entity experienced a data breach. For example, web crawler 120 may scan various news websites to determine whether an entity (e.g., department store, financial bureau, technology company, etc.) associated with a third party system 106 experienced a data breach. In some embodiments, web crawler 120 may utilize natural language processing technology in order to digest, interpret, and determine whether a website includes information related to a data breach.

At operation 304, organization computing system 104 may perform a set of operations to mitigate or reduce any damage caused by the digital security violation. In some embodiments, security module 124 may identify certain users that may have an account with a compromised third party computing system 106. For example, security module 124 may access database 126 to determine whether a user has an account with a compromised third party computing system 106 or have otherwise interacted with third party computing system 106. Security module 124 may identify those users that may be vulnerable to the digital security violation based at least in part on plurality of transactions 134 stored in database 126. For example, security module 124 may parse plurality of transactions 134 across all user accounts 130 to identify those users that have transacted with an entity associated with third party system 106. In some embodiments, security module 124 may limit the search to a specific period of time (e.g., all transactions with an entity associated with third party system 106 within two weeks of the reported digital security violation).

In some embodiments, once security module 124 identifies a user that might have been affected by the digital security violation based on their transaction history, security module 124 may determine whether that user has stored their credentials for a website associated with third party computing system 106 in their user account 130. For example, each user account 130 stored in database 126 may include one or more third party profiles 136. Each third party profile 136 may be associated with a respective third party system 106. In some embodiments, each third party profile 136 may include credentials 138 associated therewith. In some embodiments, credentials 138 may be representative of authentication information associated with the user's third party account. For example, credentials 138 may include one or more of a user name and account password.

At operation 306, responsive to determining that the user has stored their user credentials with a website associated with third party system 106 in their user account 130, security module 124 may launch a web browser 140 in a computing system 104. Via web browser 140, security module 124 may execute an automated script specific to a website associated with third party system 106. In some embodiments, the automated script may be generated by machine learning module 122 and configured to mimic a set of operations that would typically be performed by a user when logging into their account with the website. Using the automated script, security module 124 may perform at least one of a plurality of remedial operations with respect to the user's account.

In some embodiments, the at least one of a plurality of remedial operations may include altering a stored payment option associated with the user's account. For example, if a user's account includes an obfuscated payment option (e.g., a virtual card number) that may be associated with a payment instrument issued by organization computing system 104, security module 124 may generate a new obfuscated payment option and replace the existing obfuscated payment option with the new obfuscated payment option.

In another example, if a user's account includes a physical payment instrument (e.g., payment details associated with a physical payment device) that may be issued by organization computing system 104, security module 124 may implement a backend process that cancels the physical payment instrument and begins the process of issuing a new physical payment instrument to be mailed to the user.

At operation 308, computing system 108 may notify organization computing system 104 that the one or more remedial options are complete. At operation 310, responsive to receiving a notification from computing system 108, organization computing system 104 may notify client device 102 of the user of the one or more remedial options taken by security module 124. For example, organization computing system 104 may notify client device 102 of a change of an obfuscated payment option or a cancelling of an existing physical payment device and issuing of a new physical payment device.

At operation 312, organization computing system 104 may determine whether the infected payment instrument is linked to other accounts of a user. For example, responsive to determining that a respective third party system 106 has been exposed to a digital security violation, security module 124 may be configured to identify a payment instrument the user used with third party system 106 and identify other third party systems 106 with which the user has used the same payment instrument. In other words, security module 124 may take additional steps to mitigate the damage caused by a digital security violation by updating a user's payment credentials with other third party systems 106. In some embodiments, security module 124 may identify other accounts of the user by parsing a plurality of transactions 134 associated with the user to identify other entities or organizations with which the user utilized the infected payment instrument. Security module 124 may then determine whether the user has stored their credentials for websites associated with other third party computing systems 106 in their user account 130.

At operation 314, responsive to determining that the infected payment instrument is linked to other websites associated with other third party system 106 in their user account 130, security module 124 may launch a series web browsers 140 in one or more computing systems 108. Via the one or more web browsers 140, security module 124 may execute a series of automated scripts, each script specific to a website associated with a respective third party system 106. Using the automated script, security module 124 may perform at least one of a plurality of remedial operations with respect to the user's account.

At operation 316, computing system 108 may notify organization computing system 104 that the one or more remedial options are complete. At operations 318, responsive to receiving one or more notifications from computing system 108, organization computing system 104 may notify client device 102 of the user of the one or more remedial options taken by security module 124.

Figure 4:
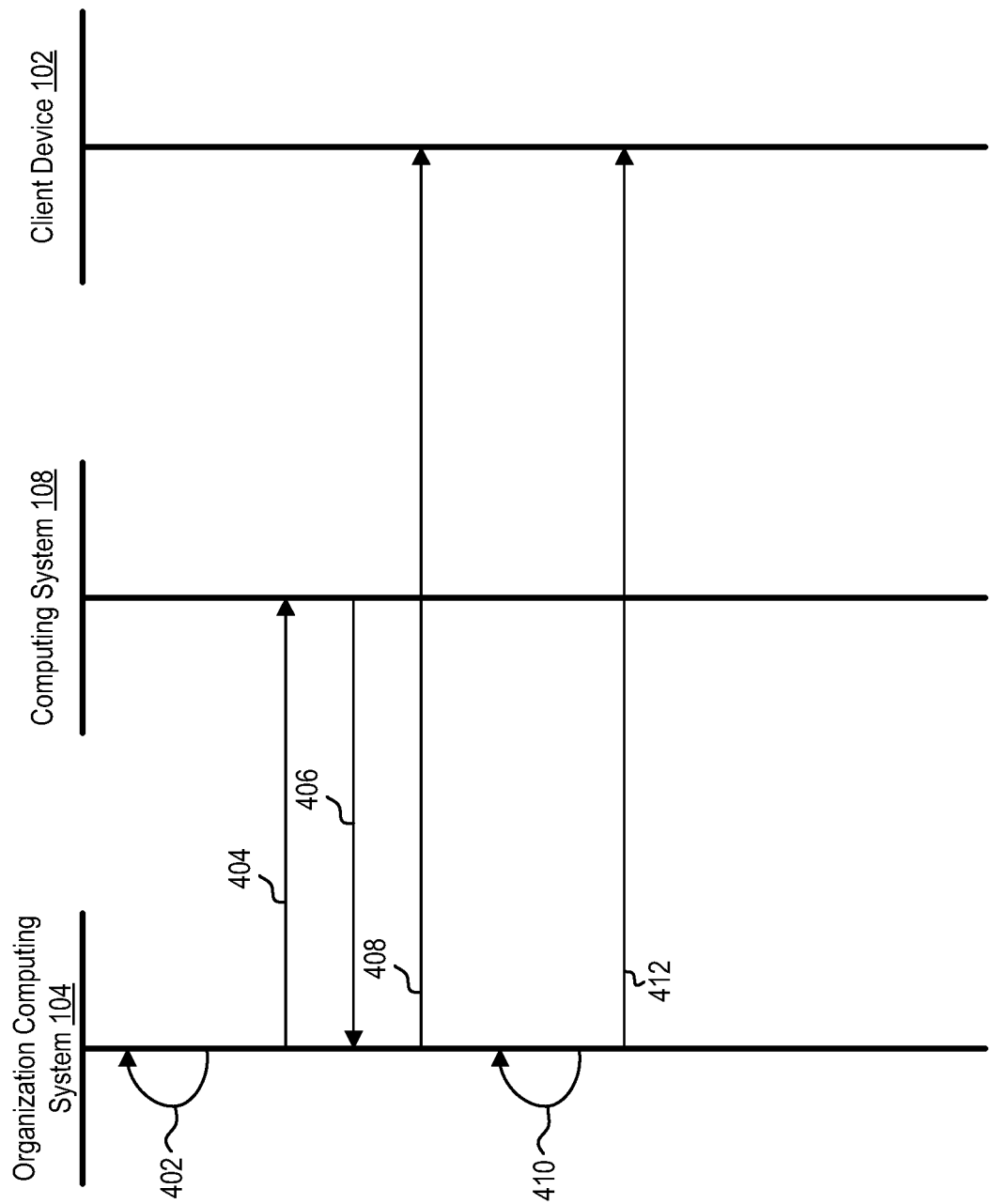
FIG. 4 is a block diagram illustrating communications among components of computing environment, according to example embodiments.

FIG. 4 is a block diagram illustrating communications among components of computing environment 100, according to example embodiments.

At operation 402, security module 124 may determine that a third party system 106 has experienced a digital security violation. In some embodiments, security module 124 may determine that a third party system 106 has experienced a digital security violation by receiving an electronic message from third party system 106, notifying organization computing system 104 that third party system 106 underwent a digital security violation. In some embodiments, security module 124 may identify that a third party system 106 has been exposed to a digital security violation via web crawler 120. For example, web crawler 120 may scan the world wide web to determine if an entity experienced a data breach.

Responsive to determining that third party system 106 has experienced a digital security violation, security module 124 may perform a set of operations to mitigate or reduce any damage caused by the digital security violation. In some embodiments, security module 124 may identify certain users that may have an account with a compromised third party computing system 106. For example, security module 124 may access database 126 to determine whether a user has an account with a compromised third party computing system 106 or have otherwise interacted with third party computing system 106. Security module 124 may identify those users that may be vulnerable to the digital security violation based at least in part on plurality of transactions 134 stored in database 126. For example, security module 124 may parse plurality of transactions 134 across all user accounts 130 to identify those users that have transacted with an entity associated with third party system 106. In some embodiments, security module 124 may limit the search to a specific period of time (e.g., all transactions with an entity associated with third party system 106 within two weeks of the reported digital security violation).

In some embodiments, once security module 124 identifies a user that might have been affected by the digital security violation based on their transaction history, security module 124 may determine whether that user has stored their credentials for a website associated with third party computing system 106 in their user account 130. For example, each user account 130 stored in database 126 may include one or more third party profiles 136. Each third party profile 136 may be associated with a respective third party system 106. In some embodiments, each third party profile 136 may include credentials 138 associated therewith. In some embodiments, credentials 138 may be representative of authentication information associated with the user's third party account. For example, credentials 138 may include one or more of a user name and account password.

At operation 404, responsive to determining that the user has stored their user credentials with a website associated with third party system 106 in their user account 130, security module 124 may launch a web browser 140 in a computing system 104. Via web browser 140, security module 124 may execute an automated script specific to a website associated with third party system 106. In some embodiments, the automated script may be generated by machine learning module 122 and configured to mimic a set of operations that would typically be performed by a user when logging into their account with the website. Using the automated script, security module 124 may perform at least one of a plurality of remedial operations with respect to the user's account.

In some embodiments, the at least one of a plurality of remedial operations may include altering a stored payment option associated with the user's account. For example, if a user's account includes an obfuscated payment option (e.g., a virtual card number) that may be associated with a payment instrument issued by organization computing system 104, security module 124 may generate a new obfuscated payment option and replace the existing obfuscated payment option with the new obfuscated payment option.

In another example, if a user's account includes a physical payment instrument (e.g., payment details associated with a physical payment device) that may be issued by organization computing system 104, security module 124 may implement a backend process that cancels the physical payment instrument and begins the process of issuing a new physical payment instrument to be mailed to the user.

At operation 406, computing system 108 may notify organization computing system 104 that the one or more remedial options are complete. At operation 408, responsive to receiving a notification from computing system 108, organization computing system 104 may notify client device 102 of the user of the one or more remedial options taken by security module 124. For example, organization computing system 104 may notify client device 102 of a change of an obfuscated payment option or a cancelling of an existing physical payment device and issuing of a new physical payment device.

At operation 410, organization computing system 104 may determine whether the infected payment instrument is linked to other accounts of a user. For example, responsive to determining that a respective third party system 106 has been exposed to a digital security violation, security module 124 may be configured to identify a payment instrument the user used with third party system 106 and identify other third party systems 106 with which the user has used the same payment instrument. In other words, security module 124 may take additional steps to mitigate the damage caused by a digital security violation by updating a user's payment credentials with other third party systems 106. In some embodiments, security module 124 may identify other accounts of the user by parsing a plurality of transactions 134 associated with the user to identify other entities or organizations with which the user utilized the infected payment instrument. Security module 124 may then determine whether the user has stored their credentials for websites associated with other third party computing systems 106 in their user account 130.

In some embodiments, security module 124 may determine that the user has used the same payment instrument with another entity associated with another third party system 106, but the user has not stored their user credentials in their user account 130. In such circumstances, security module 124 would be unable to perform a series of operations to automatically log into the user's account to perform one or more remedial operations. As such, at step 412, security module 124 may transmit a message to client device 102. The message may include information directing the user to provide their credentials with the website associated with the other third party system 106.

Figure 5:
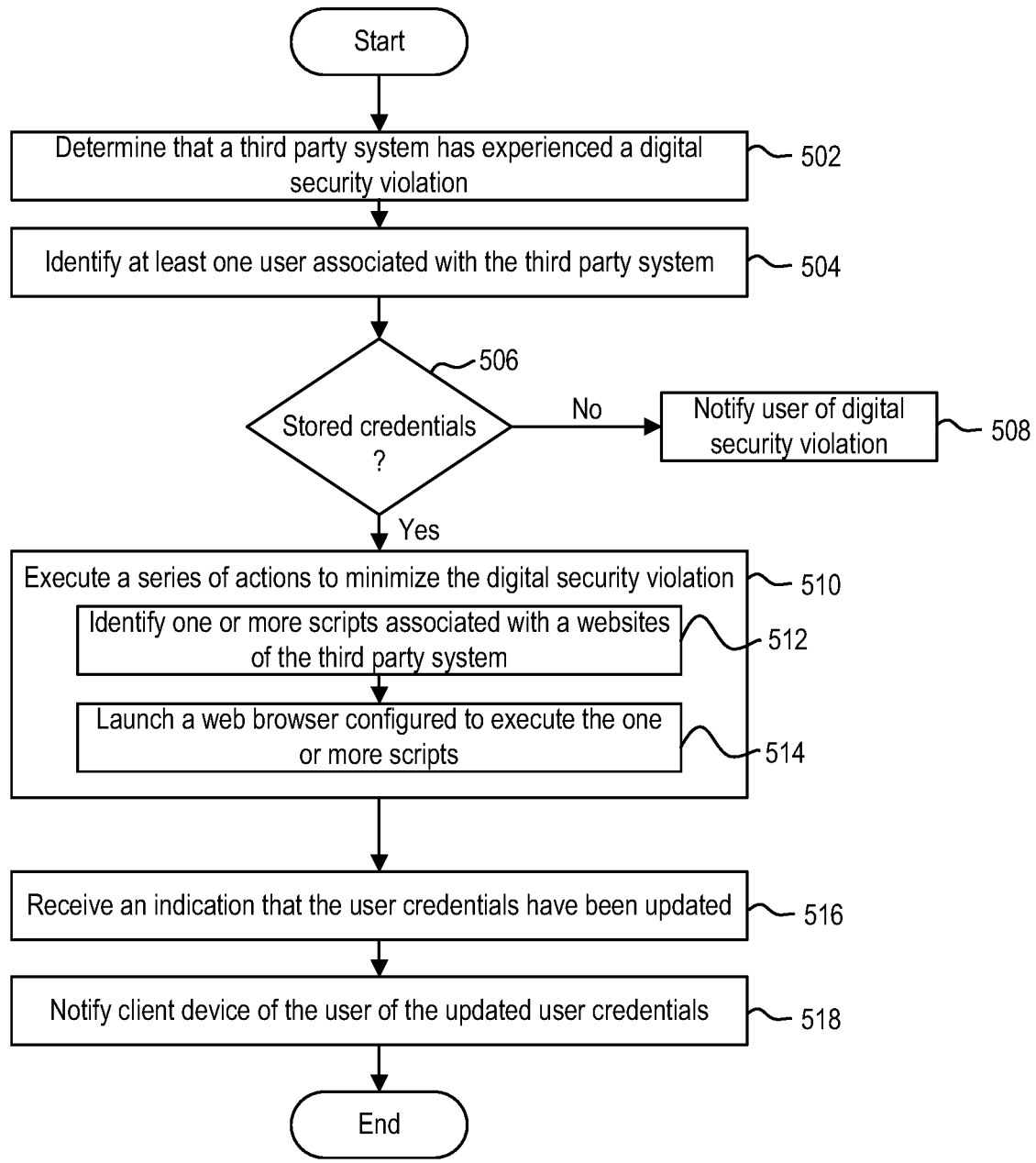
FIG. 5 is a flow diagram illustrating a method, according to one exemplary embodiment.

FIG. 5 is a block diagram illustrating a method 500, according to example embodiments. In some embodiments, method 500 may begin at step 502.

At step 502, organization computing system 104 may determine that a third party system 106 has experienced a digital security violation. In some embodiments, security module 124 may determine that a third party system 106 has experienced a digital security violation by receiving an electronic message from third party system 106, notifying organization computing system 104 that third party system 106 underwent a digital security violation. In some embodiments, security module 124 may identify that a third party system 106 has been exposed to a digital security violation via web crawler 120. For example, web crawler 120 may scan the world wide web to determine if an entity experienced a data breach.

At step 504, organization computing system 104 may identify at least one user associated with third party system 106. To identify the at least one user associated with third party system 106, security module 124 may access database 126 to determine whether a user has an account with a compromised third party computing system 106 or have otherwise interacted with third party computing system 106. Security module 124 may identify that a user may be vulnerable to the digital security violation based at least in part on plurality of transactions 134 stored in database 126. For example, security module 124 may parse plurality of transactions 134 across all user accounts 130 to identify those users that have transacted with an entity associated with third party system 106. In some embodiments, security module 124 may limit the search to a specific period of time (e.g., all transactions with an entity associated with third party system 106 within two weeks of the reported digital security violation).

At step 506, organization computing system 104 may determine whether the user has stored their user credentials with a website associated with third party system 106 in their user account 130. For example, each user account 130 stored in database 126 may include one or more third party profiles 136. Each third party profile 136 may be associated with a respective third party system 106. In some embodiments, each third party profile 136 may include credentials 138 associated therewith. In some embodiments, credentials 138 may be representative of authentication information associated with the user's third party account. For example, credentials 138 may include one or more of a user name and account password.

If at step 506, organization computing system 104 determines that the user has not stored their user credentials with the website associated with third party system 106 in their user account 130, then method 500 may proceed to step 508. At step 508, organization computing system 104 may transmit a message to client device 102. The message may include information directing the user to provide their credentials with the website associated with the third party system 106.

If, however, at step 506, organization computing system 104 determines that the user has stored their user credentials with the website associated with third party system 106 in their user account 130, then method 500 may proceed to step 510. At step 510, organization computing system 104 may execute a series of actions to minimize or reduce the effect of the digital security violation on the user. For example, step 510 may include sub-steps 512 and 514.

At sub-step 512, organization computing system 104 may identify one or more scripts associated with a website of third party system 106. In some embodiments, the automated script may be generated by machine learning module 122 and configured to mimic a set of operations that would typically be performed by a user when logging into their account with the website.

At sub-step 514, organization computing system 104 may launch a web browser configured to execute the one or more scripts. Via web browser 140, security module 124 may execute an automated script specific to a website associated with third party system 106.

Using the automated script, security module 124 may perform at least one of a plurality of remedial operations with respect to the user's account.

In some embodiments, the at least one of a plurality of remedial operations may include altering a stored payment option associated with the user's account. For example, if a user's account includes an obfuscated payment option (e.g., a virtual card number) that may be associated with a payment instrument issued by organization computing system 104, security module 124 may generate a new obfuscated payment option and replace the existing obfuscated payment option with the new obfuscated payment option.

In another example, if a user's account includes a physical payment instrument (e.g., payment details associated with a physical payment device) that may be issued by organization computing system 104, security module 124 may implement a backend process that cancels the physical payment instrument and begins the process of issuing a new physical payment instrument to be mailed to the user.

At step 516, organization computing system 104 may receive an indication from computing system 108 that the one or more remedial options are complete.

At step 518, responsive to receiving a notification from computing system 108, organization computing system 104 may notify client device 102 of the user of the one or more remedial options taken by security module 124. For example, organization computing system 104 may notify client device 102 of a change of an obfuscated payment option or a cancelling of an existing physical payment device and issuing of a new physical payment device.

Figure 6A:
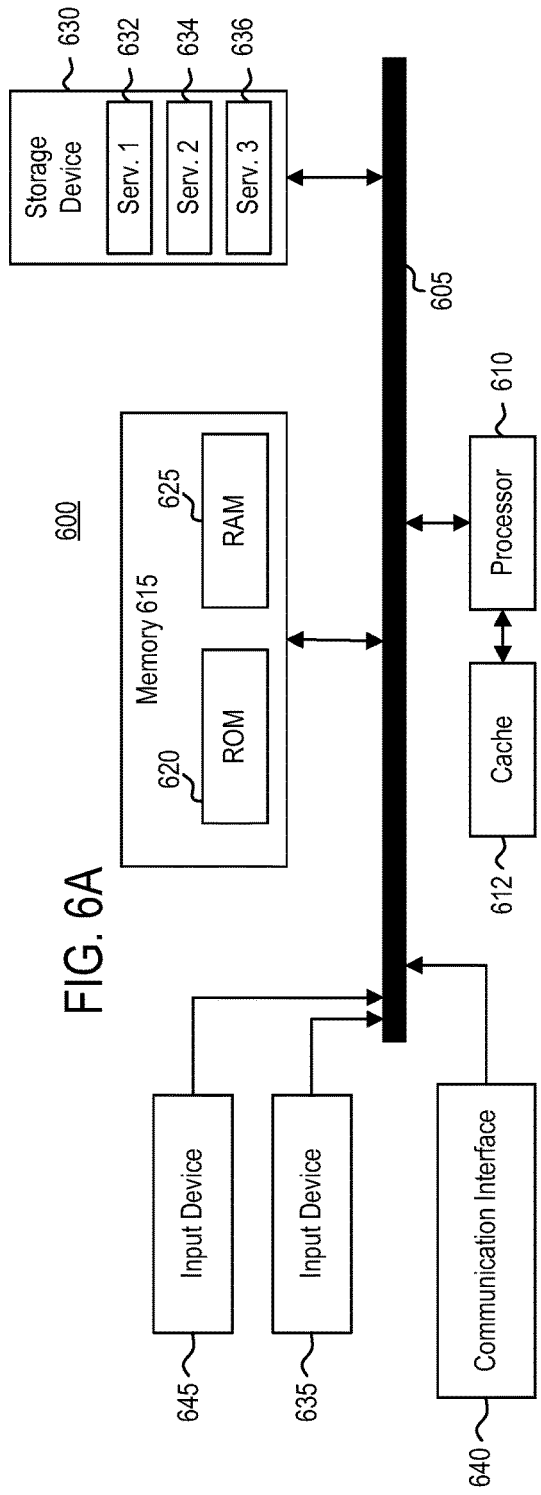
FIG. 6A illustrates a system bus computing system architecture, according to example embodiments.

FIG. 6A illustrates an architecture of system bus computing system 600, according to example embodiments. One or more components of system 600 may be in electrical communication with each other using a bus 605. System 600 may include a processor (e.g., one or more CPUs, GPUs or other types of processors) 610 and a system bus 605 that couples various system components including the system memory 615, such as read only memory (ROM) 620 and random access memory (RAM) 625, to processor 610. System 600 can include a cache of high-speed memory connected directly with, in close proximity to, or integrated as part of processor 610. System 600 can copy data from memory 615 and/or storage device 630 to cache 612 for quick access by processor 610. In this way, cache 612 may provide a performance boost that avoids processor 610 delays while waiting for data. These and other modules can control or be configured to control processor 610 to perform various actions. Other system memory 615 may be available for use as well. Memory 615 may include multiple different types of memory with different performance characteristics. Processor 610 may be representative of a single processor or multiple processors. Processor 610 can include one or more of a general purpose processor or a hardware module or software module, such as service 1 632, service 2 634, and service 6 636 stored in storage device 630, configured to control processor 610, as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the system 600, an input device 645 which can be any number of input mechanisms, such as a microphone for speech, a touch-sensitive screen for gesture or graphical input, keyboard, mouse, motion input, speech and so forth. An output device 635 (e.g., a display) can also be one or more of a number of output mechanisms known to those of skill in the art. In some instances, multimodal systems can enable a user to provide multiple types of input to communicate with system 600. Communications interface 640 can generally govern and manage the user input and system output. There is no restriction on operating on any particular hardware arrangement and therefore the basic features here may easily be substituted for improved hardware or firmware arrangements as they are developed.

Storage device 630 may be a non-volatile memory and can be a hard disk or other types of computer readable media that can store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 can include services 632, 634, and 636 for controlling the processor 610. Other hardware or software modules are contemplated. Storage device 630 can be connected to system bus 605. In one aspect, a hardware module that performs a particular function can include the software component stored in a computer-readable medium in connection with the necessary hardware components, such as processor 610, bus 605, output device 635 (e.g., a display), and so forth, to carry out the function.

Figure 6B:
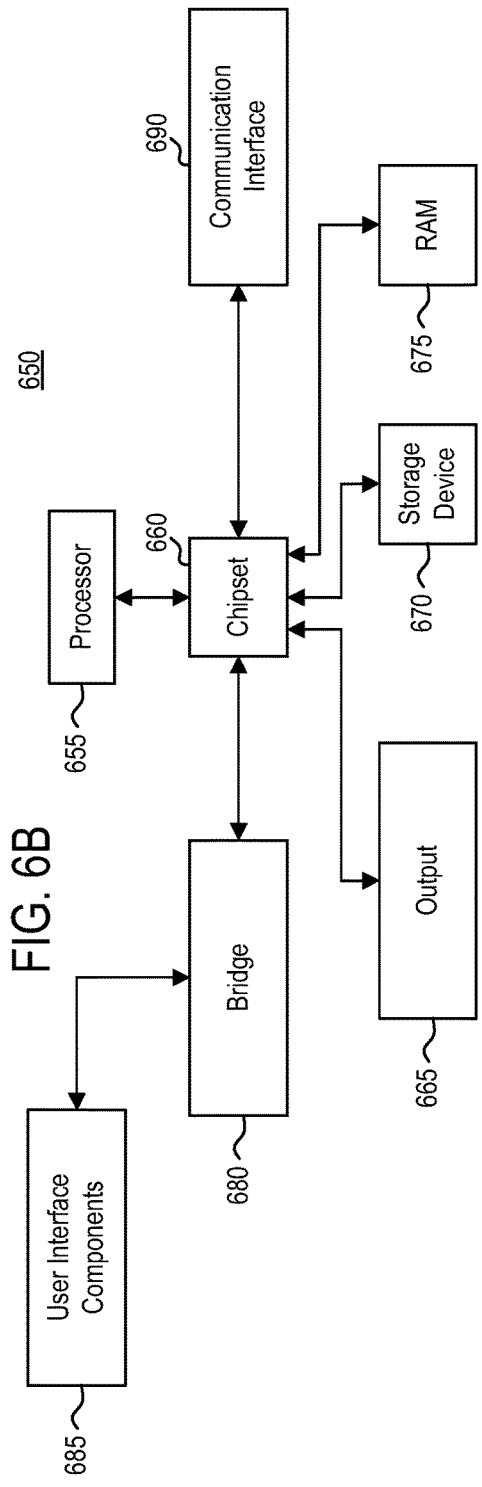
FIG. 6B illustrates a computer system having a chipset architecture, according to example embodiments.

FIG. 6B illustrates a computer system 650 having a chipset architecture, according to example embodiments. Computer system 650 may be an example of computer hardware, software, and firmware that can be used to implement the disclosed technology. System 650 can include one or more processors 655, representative of any number of physically and/or logically distinct resources capable of executing software, firmware, and hardware configured to perform identified computations. One or more processors 655 can communicate with a chipset 660 that can control input to and output from one or more processors 655. In this example, chipset 660 outputs information to output 665, such as a display, and can read and write information to storage device 670, which can include magnetic media, and solid-state media, for example. Chipset 660 can also read data from and write data to storage device 675 (e.g., RAM). A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 655 analyzing data stored in storage device 670 or 675. Further, the machine can receive inputs from a user through user interface components 685 and execute appropriate functions, such as browsing functions by interpreting these inputs using one or more processors 655.

It can be appreciated that example systems 600 and 650 can have more than one processor 610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:
   determining, by a computing system, that a third party system has been exposed to a digital security violation;
   identifying, by the computing system, a first user account registered with the computing system that has a second account associated with the third party system;
   determining, by the computing system, that the first user account comprises an indication of a storage location comprising a set of user credentials stored therein, the set of user credentials used to authenticate the second account with the third party system;
   launching, by the computing system, a web browser to access a website associated with the third party system;
   executing, by the computing system via the web browser, an automated script specific to the website associated with the third party system, the automated script configured to access the second account with the third party system using the set of user credentials stored at the storage location; and
   performing, by the computing system via the web browser, at least one of a plurality of remedial operations with respect to the second account, wherein performing the at least one of the plurality of remedial operations with respect to the second account comprises altering a stored payment option associated with the second account by:
      generating a new obfuscated payment option, and
      replacing the stored payment option with the new obfuscated payment option.

2. The method of claim 1, wherein determining, by the computing system, that the third party system has been exposed to the digital security violation, comprises:
   crawling a plurality of news websites and applying natural language processing to news headlines or news articles to determine whether the digital security violation occurred.

3. The method of claim 1, wherein generating the stored payment option associated with the second account comprises:
   initiating one or more backend processes to cancel a physical payment instrument associated with the second account and issue a new physical payment instrument.

4. The method of claim 1, wherein the automated script is generated by a machine learning model trained to traverse the website of the third party system and modify information associated with an account associated with the third party system.

5. The method of claim 1, further comprising:
   identifying, by the computing system, that a payment instrument linked to the second account is linked to a third account with a second third party system; and
   based on the identifying, executing, by the computing system via the web browser, a second automated script specific to a second website associated with the second third party system to access the third account with the second third party system using a second set of user credentials stored at the storage location.

6. A non-transitory computer readable medium comprising one or more sequences of instructions, which, when executed by a processor, causes a computing system to perform operations comprising:
   determining, by the computing system, that a third party system has been exposed to a digital security violation;
   identifying, by the computing system, a first user account registered with the computing system that has a second account associated with the third party system;
   determining, by the computing system, that the first user account comprises an indication of a storage location comprising a set of user credentials stored therein, the set of user credentials used to authenticate the second account with the third party system;
   executing, by the computing system, an automated script to access the second account with the third party system using the set of user credentials stored at the storage location; and
   performing, by the computing system, at least one of a plurality of remedial operations with respect to the second account, wherein performing the at least one of the plurality of remedial operations with respect to the second account comprises altering a stored payment option associated with the second account by:
      generating a new obfuscated payment option, and
      replacing the stored payment option with the new obfuscated payment option.

7. The non-transitory computer readable medium of claim 6, wherein determining, by the computing system, that the third party system has been exposed to the digital security violation, comprises:
   crawling a plurality of news websites and applying natural language processing to news headlines or news articles to determine whether the digital security violation occurred.

8. The non-transitory computer readable medium of claim 6, wherein generating the stored payment option associated with the second account comprises:
   initiating one or more backend processes to cancel a physical payment instrument associated with the second account and issue a new physical payment instrument.

9. The non-transitory computer readable medium of claim 6, wherein the automated script is trained to traverse a website of the third party system and modify information associated with an account associated with the third party system.

10. The non-transitory computer readable medium of claim 6, further comprising:
    identifying, by the computing system, that a payment instrument linked to the second account is linked to a third account with a second third party system; and
    based on the identifying, executing, by the computing system, a second automated script specific to a second website associated with the second third party system to access the third account with the second third party system using a second set of user credentials stored at the storage location.

11. A system, comprising:

a processor; and a memory having programming instructions stored thereon, which, when executed by the processor, causes the system to perform operations comprising:

determining that a third party system has been exposed to a digital security violation;

identifying a first user account registered with the system;

determining that the first user account includes an indication of a second account associated with the third party system;

identifying a set of user credentials associated with the second account, the set of user credentials used to authenticate the second account with the third party system;

launching a web browser to access a website associated with the third party system;

executing, via the web browser, an automated script specific to the website associated with the third party system, the automated script configured to access the second account with the third party system using the set of user credentials stored; and performing, via the web browser, at least one of a plurality of remedial operations with respect to the second account, wherein performing the at least one of the plurality of remedial operations with respect to the second account comprises altering a stored payment option associated with the second account by:

generating a new obfuscated payment option, and replacing the stored payment option with the new obfuscated payment option.

12. The system of claim 11, wherein determining that the third party system has been exposed to the digital security violation, comprises:

crawling a plurality of news websites and applying natural language processing to news headlines or news articles to determine whether the digital security violation occurred.

13. The system of claim 11, wherein generating the stored payment option associated with the second account comprises:

initiating one or more backend processes to cancel a physical payment instrument associated with the second account and issue a new physical payment instrument.

14. The system of claim 11, wherein the operations further comprise:

identifying that a payment instrument linked to the second account is linked to a third account with a second third party system; and based on the identifying, executing, via the web browser, a second automated script specific to a second website associated with the second third party system to access the third account with the second third party system using a second set of user credentials.

* * * * *